(12) United States Patent
Alders

(10) Patent No.: US 7,549,235 B2
(45) Date of Patent: Jun. 23, 2009

(54) MULTIFUNCTIONAL TAPE MEASURE DEVICE

(76) Inventor: Troy L. Alders, 13472 Riley Peak Rd., Conifer, CO (US) 80433

( * ) Notice: Subject to any disclaimer, the term of this patent is extended or adjusted under 35 U.S.C. 154(b) by 32 days.

(21) Appl. No.: 11/595,183

(22) Filed: Nov. 10, 2006

(65) Prior Publication Data

US 2007/0101600 A1    May 10, 2007

Related U.S. Application Data

(60) Provisional application No. 60/735,784, filed on Nov. 10, 2005.

(51) Int. Cl.
 *G01B 3/10* (2006.01)
(52) U.S. Cl. .......................... 33/760; 33/770
(58) Field of Classification Search ........... 33/759–761, 33/767–770
 See application file for complete search history.

(56) References Cited

U.S. PATENT DOCUMENTS

| | | | | |
|---|---|---|---|---|
| 2,992,487 A * | 7/1961 | Miller | ............................ | 33/760 |
| 3,205,584 A * | 9/1965 | Overaa | ......................... | 33/760 |
| 4,759,441 A * | 7/1988 | Leurck | ......................... | 206/373 |
| 5,230,159 A | 7/1993 | Lipsey | | |
| 5,430,952 A * | 7/1995 | Betts | ............................ | 33/760 |
| 5,829,152 A | 11/1998 | Potter et al. | | |
| 6,574,881 B2 | 6/2003 | Cole, III | | |
| 6,598,311 B2 | 7/2003 | Noon | | |
| 6,769,618 B1 | 8/2004 | Finkelstein | | |
| 6,874,189 B2 | 4/2005 | Ackeret | | |
| 7,065,895 B2 * | 6/2006 | Hoopengarner | ............... | 33/760 |
| 7,174,655 B1 * | 2/2007 | Gibbons et al. | ................ | 33/761 |
| 7,260,899 B2 * | 8/2007 | Jones | .......................... | 33/760 |
| 2002/0121025 A1 * | 9/2002 | Leite | ........................... | 33/374 |

* cited by examiner

*Primary Examiner*—Yaritza Guadalupe-McCall
(74) *Attorney, Agent, or Firm*—James Ray & Assoc.

(57) ABSTRACT

A multifunctional tape measure device includes a housing, a tape reel which is mounted within an interior chamber of the housing, a flexible measuring tape which is wound on the tape reel and which extends through an aperture formed in the front wall of the housing and a brake for releaseably holding the extended measuring tape. A magnet is rigidly mounted within a recess formed in the bottom wall of the housing and a light is mounted within the housing and is manually operable for generating a visible light beam. A magnifying lens is attached to the housing adjacent one of the first and second side of the housing. A writing surface is retained within a recess formed in an opposed one of the first and second side of the housing and a holder is provided on the housing for retaining a writing instrument.

18 Claims, 1 Drawing Sheet

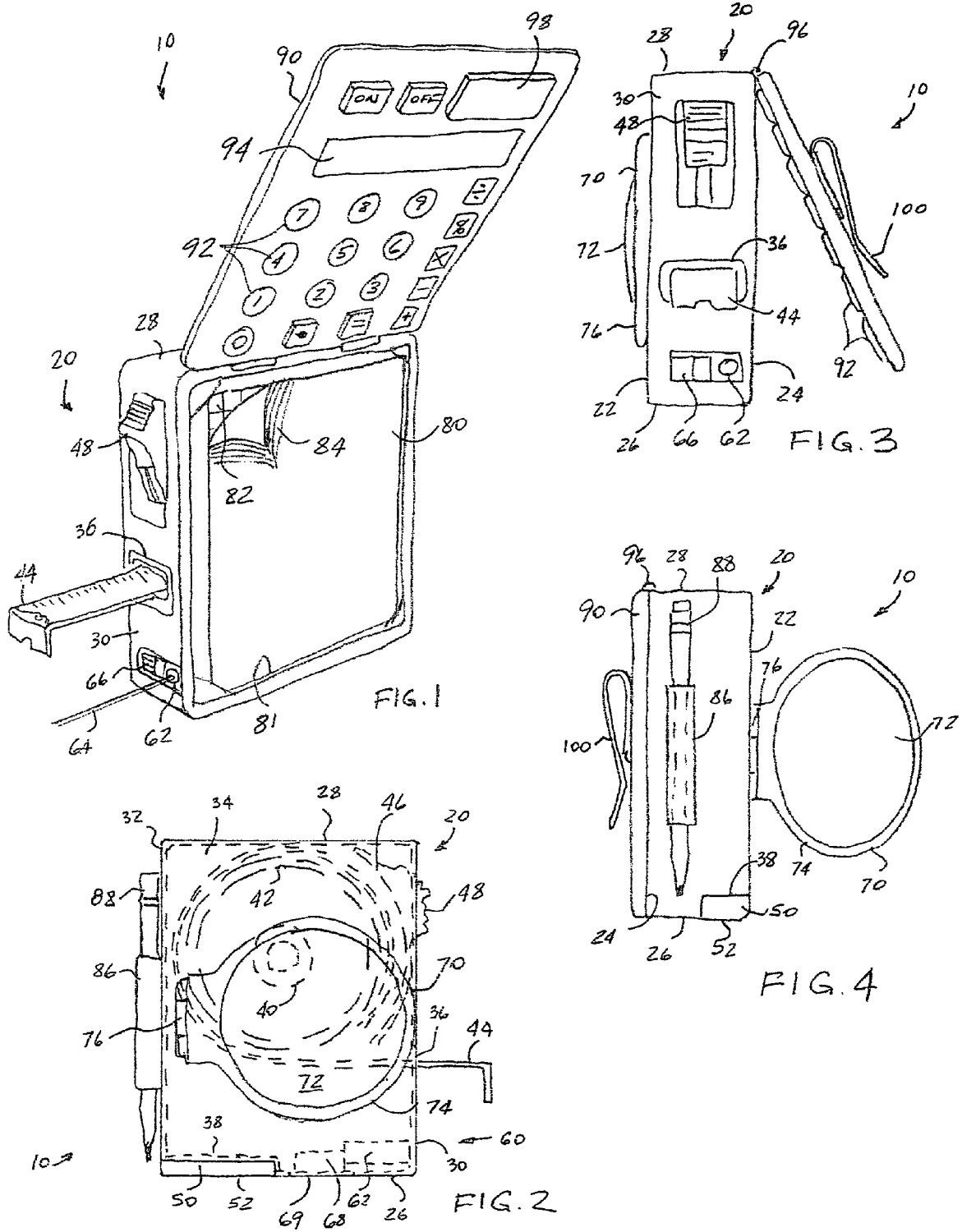

MULTIFUNCTIONAL TAPE MEASURE DEVICE

CROSS-REFERENCE TO RELATED APPLICATIONS

This application is related to and claims priority from Provisional patent application Ser. No. 60/735,784 filed Nov. 10, 2005.

FIELD OF THE INVENTION

The present invention relates, in general, to tape measures and, more particularly, this invention relates to a multifunctional tape measure device which integrally incorporates various accessories to perform a number of related tasks without the need to carry separate tools, writing means, computational device and the like.

BACKGROUND OF THE INVENTION

One problem that is constantly experienced by everyday consumers attempting to purchase various items is in the need to carry multiple tools and writing implements. Tape measure is required to take and verify accurate measurements from said items. Magnet is required to help verify what general type of metal item is made such as brass, steel, aluminum, lead since magnets do not stick to brass or aluminum. Ultraviolet light is used to check for presence of cracks, chips or other flaws that are very difficult to see. Magnifying lens is needed for close-up inspection of any suspect areas as well as for locating and identifying sometimes hard to find "makers marks" and patent dates. Calculator is often needed to calculate purchase costs including any applicable discounts and sales taxes. And finally, note pad and pen or pencil are used to record any pertinent information associated with the item. Yet, it is often very cumbersome and frustrating for consumers to carry all these required but separate tools and implements.

Efforts have been made to alleviate problem of carrying separate tools and implements. U.S. Pat. No. 6,256,901 issued to Lin discloses a manually operable lamp in combination with the tape measure which is positioned to direct a conventional light beam onto a portion of the flexible tape for ease of reading. U.S. Pat. No. 6,598,311 issued to Noon teaches a magnifying lens in combination with the tape measure which is positioned over a portion of the flexible tape for ease of reading. However, the combination tape measures of the above prior art are difficult to handle and use for inspection purposes. U.S. Pat. No. 5,230,159 issued to Lipsey discloses a calculator case which is attached to the side of the tape measure surface. The calculator requires greater than desired handling and repositioning effort in order to prevent its keypad, display and solar cell from damages during use or storage of the tape measure.

Therefore, there is a need for a multifunctional tape measure device which incorporates various tools and writing implements and which is simple and efficiently effective to use for measuring, inspection and calculation purposes.

SUMMARY OF THE INVENTION

According to one embodiment, the invention provides a multifunctional tape measure device. The device includes a housing having an interior chamber formed therein. A tape real is mounted within an interior chamber of the housing. A flexible measuring tape is wound on the tape reel and extends through an aperture formed in the front wall of the housing. A brake is provided for releaseably holding the measuring tape in the extended position. A magnet is rigidly mounted within a recess formed in the bottom wall of the housing. A light is mounted within the housing and is manually operable for generating a visible light beam. A magnifying lens is attached to the housing adjacent one of the first and second side of the housing. A writing surface is retained within a recess formed in an opposed one of the first and second side of the housing. A holder is provided on the housing for retaining a writing instrument.

According to another embodiment of the invention, there is provided an improved tape measure device having a magnet means which is rigidly mounted within a recess formed within a portion of the peripheral wall of the housing, whereby an outer surface of the magnet means is coplanar with the portion of the peripheral wall.

According to yet another embodiment, the invention provides an improved tape measure device having a calculator means having each of a keypad and a display disposed on a first surface thereof and an attachment means for attaching the calculator means to the housing, whereby the calculator means is rotatable between a first position wherein the calculator means is juxtaposed with one side of the housing and a second position wherein the calculator means extends beyond a boundary of the housing.

According to a further embodiment of the invention, there is provided an improved tape measure device having a magnifying lens means and an attachment means for attaching the magnifying lens means to the housing, whereby the magnifying lens means is rotatable between a first position wherein the magnifying lens means is juxtaposed with one side of the housing and a second position wherein the magnifying lens means extends beyond a boundary of the housing.

OBJECTS OF THE INVENTION

It is, therefore, one of the primary objects of the present invention to provide a multifunctional tape measure device.

Another object of the present invention is to provide a multifunctional tape measure device which incorporates a magnifying lens.

Yet another object of the present invention is to provide a multifunctional tape measure device which includes a calculator.

A further object of the present invention is to provide a multifunctional tape measure device which emits ultra-violent light beam.

Yet a further object of the present invention is to provide a multifunctional tape measure device which incorporates writing surface and writing implement.

An additional object of the present invention is to provide a multifunctional tape measure device which includes a magnet.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a perspective view of a multifunctional tape measure device of the present invention;

FIG. 2 is a side elevation view of the multifunctional tape measure device of FIG. 1;

FIG. 3 is a front elevation view of the multifunctional tape measure device of FIG. 1; and FIG. 4 is a rear elevation view of the multifunctional tape measure device of FIG. 1.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-4, wherein there is shown a multifunctional tape measure device, generally designated as 10. The device 10 includes a housing, generally designated as 20, having each of a first side 22, an opposed second side 24, a bottom wall 26, a top wall 28, a front wall 30 and a rear wall 32. The housing 20 has an interior chamber 34 formed therein. The housing 20 may be manufactured in a conventional fashion from plastic or metallic materials. It is presently preferred for the housing 20 to have width of about 2.8 inches, height of about 3.0 inches and thickness of about 1.5 inches.

A tape reel 40 is mounted within the interior chamber 34 for rotation in forward and reverse directions. The tape reel 40 has a conventional spring means 42 to bias the tape reel 40 for rotation in the reverse direction. A flexible measuring tape 44 is wound on the tape reel 40 and is extendable, preferably manually, through an aperture 36 formed in the front wall 30 of the housing 20. A brake means 46 is provided for releaseably holding the measuring tape 44 being extended from the housing 20 and is manually operable by a lever 48.

The device 10 further includes a magnet means 50 which is rigidly mounted within a recess 38 formed in the bottom wall 26 of the housing 20. It is presently preferred for an outer surface 52 of the magnet means 50 to be coplanar with the exterior surface of the bottom wall 26 for positioning such device 10 in an upright position on its bottom wall 26.

A light means, generally designated as 60, includes a light member 62 which is capable of emitting a visible light beam 64 and a switch means 66 which is operable from an exterior surface of the housing 20. A power supply means 68 is coupled to the light member 62 and the switch means 66 for enabling generation an emission of the visible light beams 64. Such power supply means 68 is preferably a well known alkaline type battery 68. A sliding or pivoting door 69 is then adapted within the housing 20, preferably within the bottom wall 26, for installing and removing such battery 68. In the presently preferred embodiment of the invention, the light means 60 is positioned below the aperture 36 employed for extending the flexible measuring tape 44 and is capable of emitting a ultra-violet light beam 64 in a direction which is generally parallel to the direction of the extended measuring tape 44 or generally parallel to the bottom wall 26. Such positioning of the light means 60 enables ease of handling the device 10 while emitting the light beam 64 for inspection or other purposes.

A magnifying lens means 70 including a magnifying lens 72, preferably having about a 20× magnifying factor, and a support member 74, is positioned adjacent the first side 22 of the housing 20. An attachment means 76 is provided for attaching one end of the support member 74 to the housing 20. It is presently preferred that the attachment means 76 includes a pivot means 78, such as well known hinge, for rotating the magnifying lens means 70 between a first position, as best shown in FIGS. 2-3, wherein the magnifying lens 72 is juxtaposed with the first side 22 of the housing 20 and a second position, best shown in FIG. 4, wherein the magnifying lens 72 extends beyond the boundary of the housing 20 and being disposed generally coplanar with the first side 22. In such second position, the housing 20 functions as a handle for the magnifying lens means 70 and the device 10 is simply handled to use the magnifying lens means 70 for a close-up inspection of an object or for other activities that may require use of the magnifying lens, for example such as reading small print.

Now in further reference to FIG. 1, a writing surface means 80 is retained within a recess 81 formed in the second side 24 of the housing 20; Such writing surface means 80 may be a conventional reusable writing surface 82 or at least one sheet 84 made from a paper material. Advantageously, the device 10 further includes a holder 86 which is disposed on the rear wall 32 of the housing 20 for retaining a writing instrument 88 such as a pencil or a pen 2. Such writing surface 82, at least one sheet 84 and holder 86 may be of the type as disclosed in U.S. Pat. No. 4,766,673 issued to Bolson. Teachings of the U.S. Pat. No. 4,766,673 are incorporated into this document by reference thereto.

The present invention also contemplates for the device 10 to include a calculator means 90. Now in a particular reference to FIG. 1, the calculator means 90 has each of a keypad 92 and a display 94 which are disposed on a first surface thereof and an attachment means 96 for attaching the calculator means 90 to the housing 20. The attachment means 96 preferably includes a pivot means 96, such as a hinge, for rotating the calculator means 90 between a first position, best shown in FIG. 4, wherein the calculator is juxtaposed with the second side the 24, of the housing 20 and a second position, best shown in FIG. 1, wherein the calculator means 90 extends beyond the boundary of the housing 20. It is further presently preferred that the keypad 92 and the display 94 face the second side 24 when the calculator means 90 is disposed in the first position. In such arrangement, the calculator means 90 is simply pivoted into the second position for using the keypad 92 and the display 94 and then simply pivoted into the first position for preventing damages to the keypad 92 and the display 94 during use or storage of the device 10. Advantageously, the keypad 92 and the display 94 fit within the recess 81 when the calculator means 90 is disposed in the first position.

The calculator means 90 further includes a power supply 98. Preferably, the power supply 98 is a solar cell 98. Alternatively or in combination with solar cell 98, the power supply 98 may include the battery 68 employed for operating the light means 60 or an independent battery (not shown) which is disposed within the calculator means 90. Advantageously, the light means 60 may be adapted to be operable by the solar cell 98 and it is contemplated that the solar cell 98 may be disposed oppositely to the keypad 92 and the display 94.

The device 10 may additionally include a conventional belt clip means 100 which is attached in a conventional fashion to the opposed second surface of the calculator means 90.

It will be apparent to those skilled in the art that the tape measure device 10 constructed according to the above described embodiments is advantageous for providing a convenient and simply operable multifunctional device which aids antique shoppers and everyday consumers in purchasing new and old merchandise and which eliminates the need to carry separate tools, writing means, computational device and the like.

It will be further apparent to those skilled in the art, that the present invention may be used in other applications. For example, such device 10 may be employed at a construction site for at least measuring distances, calculating distances and required materials, writing down any required information, lighting dark areas, magnifying small print and the like.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A multifunctional tape measure device, said device comprising:
   (a) a housing having each of a first side, an opposed second side, a bottom wall, a top wall, a front wall and a rear wall, said housing having an interior chamber formed therein;
   (b) a tape reel mounted within said interior chamber for rotation in forward and reverse directions, said tape reel having a spring means to bias said tape reel for rotation in said reverse direction;
   (c) a flexible measuring tape which is wound on said tape reel and which extends through an aperture formed in said front wall of said housing;
   (d) a brake means for releaseably holding said measuring tape being extended from said housing;
   (e) a magnet rigidly mounted within a recess formed in said bottom wall of said housing, whereby an outer surface of said magnet is coplanar with said bottom wall;
   (f) a light means mounted within said housing and manually operable for generating a visible light beam, said visible light beam extending parallel to said flexible measuring tape when said flexible measuring tape is extended, said light means positioned in said front wall underneath said aperture having said flexible measuring tape extending therethrough, said light means including a light member and a switch juxtaposed therewith in a plane substantially parallel to a plane having said flexible measuring tape extending therewithin, said switch operable from an exterior surface of said front wall of said housing;
   (g) a magnifying lens positioned adjacent one of said first and second side of said housing;
   (h) a pivot means for attaching said magnifying lens to said housing, whereby said magnifying lens is rotatable about an axis parallel to an edge of said housing between a first position wherein a surface of said magnifying lens is juxtaposed with said one of said first and second side of said housing coplanar with said tape reel and perpendicular to a plane of said flexible measuring tape when said flexible measuring tape is extended and a second position wherein said magnifying lens extends beyond a boundary of said housing;
   (i) a write-on member which is retained within a recess formed in an opposed one of said first and second side of said housing;
   (j) a holder disposed on said housing for retaining a writing instrument; and
   (k) a calculator having a calculator casing, a keypad operable from one surface thereof, a display mounted adjacent to said keypad, a hinged pivot member secured to each of a side edge of said calculator casing and a side of said housing disposed in a plane being planar with said tape reel, whereby said calculator casing is manually pivotable about an axis parallel to a side edge of said housing between a first position wherein said one surface of said calculator casing is juxtaposed with said side of said housing carrying said side edge thereof and a second position wherein said calculator casing extends beyond a boundary of said side of said housing.

2. The device, according to claim 1, wherein said light beam is one of an ultra-violet and LED light beam.

3. The device, according to claim 1, wherein said write-on member includes at least one sheet of a paper material.

4. The device, according to claim 1, wherein said write-on member includes a reusable writing surface.

5. The device, according to claim 1, wherein a material of said housing is one of a plastic and metal.

6. In a tape measure device including a housing having a peripheral wall and an interior chamber formed therein, a tape reel mounted within said interior chamber for rotation in forward and reverse directions, said tape reel having a spring means to bias said tape reel for rotation in said reverse direction, a flexible measuring tape which is wound on said tape reel and which extends through an aperture formed in said front wall of said housing and a brake means for releaseably holding said measuring tape being extended from said housing, an improvement comprising a magnifying lens and an attachment means for attaching said magnifying lens to said housing, whereby said magnifying lens is rotatable about an axis parallel to an edge of said housing between a first position wherein surface of said magnifying lens is juxtaposed with one side of said housing coplanar with said tape reel and perpendicular to a plane of said flexible measuring tape when said flexible measuring tape is extended, said plane defined by edges of said flexible measuring tape; and a second position wherein said magnifying lens extends beyond a boundary of said housing.

7. In a tape measure device including a housing having a peripheral wall and an interior chamber formed therein, a tape reel mounted within said interior chamber for rotation in forward and reverse directions, said tape reel having a spring means to bias said tape reel for rotation in said reverse direction, a flexible measuring tape wound on said tape reel and which extends through an aperture formed in said front wall of said housing and a brake means for releaseably holding said measuring tape being extended from said housing, an improvement comprising a light source mounted within said housing and operable for generating a visible light beam, said visible light beam extending parallel to said flexible measuring tape when said flexible measuring tape is extended, said light source positioned underneath said aperture having said flexible measuring tape extending therethrough, said improvement further comprising a switch juxtaposed with said light source in a plane substantially parallel to a plane having said flexible measuring tape extending therewithin and manually operable from said front wall of said housing for selectively operating said light source.

8. The device, according to claim 7, wherein said device includes a magnifying lens and a pivot means for rotating said magnifying lens about an axis parallel to an edge of said housing between a first position wherein surface of said magnifying lens is juxtaposed with said one of said first and second side of said housing coplanar with said tape reel and perpendicular to said plane of said flexible measuring tape when said flexible measuring tape is extended, said plane defined by edges of said flexible measuring tape; and a second position wherein said magnifying lens extends beyond a boundary of said housing.

9. The device, according to claim 7, wherein said improvement further includes a calculator having each of a keypad and a display disposed on a first surface thereof and an attachment means for attaching said calculator to said opposed one of said first and second side of said housing.

10. The device, according to claim 9, wherein said attachment means includes a pivot means secured to each of said calculator and said housing for rotating said calculator about an axis parallel to an edge of said housing between a first position wherein said calculator is juxtaposed with said opposed one of said first and second side of said housing and a second position wherein said calculator means extends beyond a boundary of said housing.

11. The device, according to claim 9, wherein said each of said keypad and said display face said opposed one of said first and second side of said housing when said calculator is rotated into said first position.

12. The device, according to claim 9, wherein said calculator includes one of a battery, a solar cell and a combination thereof.

13. The device, according to claim 9, wherein said device includes a clip attached to an opposed second surface of said calculator.

14. In a tape measure device including a housing having a peripheral wall and an interior chamber formed therein, a tape reel mounted within said interior chamber for rotation in forward and reverse directions, said tape reel having a spring means to bias said tape reel for rotation in said reverse direction, a flexible measuring tape which is wound on said tape reel and which extends through an aperture formed in said front wall of said housing and a brake means for releaseably holding said measuring tape being extended from said casing, an improvement comprising a calculator having a calculator casing, a keypad operable from one surface thereof, a display mounted adjacent to said keypad, said improvement further comprising a pivot member secured to each of a side edge of said calculator casing and a side edge of said housing disposed in a plane being planar with said tape reel, whereby said calculator casing is manually pivotable about an axis parallel to said side edge of said housing between a first position wherein said one surface of said calculator casing is juxtaposed with a side of said housing carrying said side edge thereof and a second position wherein said calculator casing extends beyond a boundary of said side of said housing, said axis disposed parallel to said flexible measuring tape when said flexible measuring tape is extended.

15. The device, according to claim 14, wherein said improvement includes a light means for generating a visible light beam, said visible light beam extending parallel to said flexible measuring tape when said flexible measuring tape is extended, said light means positioned below said aperture for extending said flexible measuring tape.

16. The device, according to claim 15, wherein said light means includes a light member and a switch juxtaposed with said light member in a plane substantially parallel to a plane having said flexible measuring tape extending therewithin and operable from an exterior surface of said housing.

17. The device, according to claim 16, wherein said light means further includes a power supply means coupled to said light member and said switch for enabling generation of said visible light beams.

18. The device, according to claim 17, wherein said power supply means is one of a battery, a solar cell and a combination thereof.

* * * * *